United States Patent
Zhao et al.

(10) Patent No.: US 12,150,094 B2
(45) Date of Patent: *Nov. 19, 2024

(54) WIRELESS COMMUNICATION METHOD AND APPARATUS

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,029

(22) Filed: Jan. 5, 2024

(65) Prior Publication Data

US 2024/0147422 A1    May 2, 2024

Related U.S. Application Data

(63) Continuation of application No. 18/346,160, filed on Jun. 30, 2023, which is a continuation of application No. PCT/CN2022/072106, filed on Jan. 14, 2022.

(51) Int. Cl.
*H04W 68/02* (2009.01)
*H04W 72/232* (2023.01)
*H04W 76/28* (2018.01)

(52) U.S. Cl.
CPC ......... *H04W 68/02* (2013.01); *H04W 72/232* (2023.01); *H04W 76/28* (2018.02)

(58) Field of Classification Search
CPC ... H04W 68/02; H04W 76/28; H04W 72/232; H04W 68/005; H04W 68/00

USPC ......................................................... 370/329
See application file for complete search history.

(56) References Cited

U.S. PATENT DOCUMENTS

| | | | |
|---|---|---|---|
| 2007/0067807 A1* | 3/2007 | O'Neil | H04N 21/23439 |
| | | | 348/E7.071 |
| 2011/0320906 A1 | 12/2011 | Murakami et al. | |
| 2020/0404663 A1 | 12/2020 | Zhang et al. | |
| 2022/0141662 A1 | 5/2022 | Liao | |
| 2022/0312369 A1* | 9/2022 | He | H04W 68/005 |
| 2023/0007600 A1 | 1/2023 | Xu et al. | |
| 2023/0015708 A1* | 1/2023 | Gurumoorthy | H04W 68/02 |
| 2023/0023161 A1 | 1/2023 | Liu et al. | |
| 2023/0125531 A1 | 4/2023 | He et al. | |

(Continued)

FOREIGN PATENT DOCUMENTS

| | | |
|---|---|---|
| CN | 101946548 | 1/2011 |
| CN | 109561500 | 4/2019 |

(Continued)

OTHER PUBLICATIONS

Apple Inc., "NR UE Power Save IDLE/INACTIVE Paging Grouping Schemes," R2-2105087, 3GPP TSG-RAN WG2 eMeeting #114, May 19-27, 2021, 3 pages.

(Continued)

*Primary Examiner* — Margaret G Mastrodonato
(74) *Attorney, Agent, or Firm* — Fish & Richardson P.C.

(57) ABSTRACT

A wireless communication method and apparatus are provided. One example method includes: receiving first PEI by a first terminal device, using, by the first terminal device, at least one of the first subgroup ID or the second subgroup ID.

12 Claims, 4 Drawing Sheets

(56) References Cited

U.S. PATENT DOCUMENTS

| | | | |
|---|---|---|---|
| 2023/0144750 A1 | 5/2023 | Agiwal et al. | |
| 2023/0209464 A1 | 6/2023 | Tsai et al. | |
| 2023/0362889 A1* | 11/2023 | Xu | H04W 8/24 |
| 2024/0057034 A1* | 2/2024 | Shrivastava | H04W 68/02 |
| 2024/0188042 A1* | 6/2024 | Mohammad Soleymani | H04W 76/28 |

FOREIGN PATENT DOCUMENTS

| | | | |
|---|---|---|---|
| CN | 111356230 | 6/2020 | |
| CN | 112752341 | 5/2021 | |
| EP | 3756393 | 12/2020 | |
| JP | 5866448 B2 * | 2/2016 | H04B 17/345 |
| WO | WO 2018176372 | 4/2018 | |
| WO | WO 2021018531 | 2/2021 | |
| WO | WO 2021081736 | 5/2021 | |
| WO | WO 2022007632 | 1/2022 | |
| WO | WO 2022007844 | 1/2022 | |
| WO | WO 2022126391 | 6/2022 | |

OTHER PUBLICATIONS

Huawei, "Detailed design on paging subgrouping," R2-2110539, 3GPP TSG-RAN WG2 eMeeting #116, Nov. 1-12, 2021, 9 pages.
PCT International Search Report and Written Opinion in International Appln. No. PCT/CN2022/072106, dated Sep. 23, 2022, 12 pages (partial English translation).
Ericsson, "Indication of CN initiated or RAN initiated paging," 3GPP TSG-RAN WG2 #102, Tdoc R2-1806807, Busan, Republic of Korea, May 21-25, 2018, 6 pages.
Huawei et al., "Paging enhancements for idle/inactive mode UE," 3GPP TSG-RAN WG2 Meeting #113 electronic, R2-2101274, Online, Jan. 25-Feb. 5, 2021, 9 pages.
Huawei et al., "Further discussion on paging subgrouping," 3GPP TSG-RAN WG2 Meeting #115 electronic, R2-2108027, Online, Aug. 9-27, 2021, 8 pages.
MediaTek Inc., "Paging Monitoring with UE Subgrouping," 3GPP TSG-RAN WG2 Meeting #116 electronic, R2-2110968, Online, Nov. 1-12, 2021, 4 pages.
Office Action in Chinese Appln. No. 202280002788.2, mailed on Apr. 12, 2024, 24 pages (with English translation).

* cited by examiner

WIRELESS COMMUNICATION METHOD AND APPARATUS

CROSS-REFERENCE TO RELATED APPLICATIONS

This application is a continuation of U.S. patent application Ser. No. 18/346,160, filed on Jun. 30, 2023, which is a continuation of International Application No. PCT/CN2022/072106, filed on Jan. 14, 2022. All of the afore-mentioned patent applications are hereby incorporated by reference in their entireties.

TECHNICAL FIELD

The present application relates to the technical field of communications, and more specifically, to a wireless communication method and apparatus.

BACKGROUND

When a terminal device is in a radio resource control (RRC) idle state, the terminal device only needs to detect core network (CN)-initiated paging. When a terminal device is in an RRC inactive state, the terminal device not only needs to detect the CN-initiated paging, but also needs to detect radio access network (RAN)-initiated paging. A terminal device cannot distinguish RAN-initiated paging from CN-initiated paging, and thus a terminal device in an RRC idle state receives unnecessary RAN paging, thereby causing unnecessary power consumption.

SUMMARY

In view of the foregoing problem, the present application provides a wireless communication method and apparatus.

According to a first aspect, a wireless communication method is provided, including: receiving first paging early indication (PEI) by a first terminal device, where the first PEI corresponds to at least one paging occasion (PO), and the first PEI is associated with first information. The first information is used to indicate that a paging message in the at least one PO is a RAN-initiated paging message or a CN-initiated paging message.

According to a second aspect, a wireless communication method is provided, including: sending first PEI by a base station, where the first PEI corresponds to at least one PO, and the first PEI is associated with first information. The first information is used to indicate that a paging message in the at least one PO is a RAN-initiated paging message or a CN-initiated paging message.

According to a third aspect, a wireless communication method is provided, including: receiving first PEI by a first terminal device, where the first terminal device belongs to a first subgroup and a second subgroup, the first subgroup is configured to receive a CN-initiated paging message, the second subgroup is configured to receive a RAN-initiated paging message, where the first PEI includes first indication information and second indication information, the first indication information is indication information corresponding to the first subgroup, and the second indication information is indication information corresponding to the second subgroup; and detecting, by the first terminal device, the first indication information and/or the second indication information.

According to a fourth aspect, a wireless communication method is provided, including: sending first PEI by a base station, where a first terminal device belongs to a first subgroup and a second subgroup, the first subgroup is configured to receive a CN-initiated paging message, the second subgroup is configured to receive a RAN-initiated paging message, where the first PEI includes first indication information and second indication information, the first indication information is indication information corresponding to the first subgroup, and the second indication information is indication information corresponding to the second subgroup; and determining, by the base station, that the first terminal device detects the first indication information and/or the second indication information.

According to a fifth aspect, a wireless communications apparatus is provided, where the wireless communications apparatus is a first terminal device and includes: a communications module, configured to receive first PEI, where the first PEI corresponds to at least one PO, and the first PEI is associated with first information, where the first information is used to indicate that a paging message in the at least one PO is a RAN-initiated paging message or a CN-initiated paging message.

According to a sixth aspect, a wireless communications apparatus is provided, where the wireless communications apparatus is a base station and includes: a communications module, configured to send first PEI, where the first PEI corresponds to at least one PO, and the first PEI is associated with first information, where the first information is used to indicate that a paging message in the at least one PO is a RAN-initiated paging message or a CN-initiated paging message.

According to a seventh aspect, a wireless communications apparatus is provided, where the wireless communications apparatus is a first terminal device and the apparatus includes: a communication module, configured to receive first PEI, where the first terminal device belongs to a first subgroup and a second subgroup, the first subgroup is configured to receive a CN-initiated paging message, the second subgroup is configured to receive a RAN-initiated paging message, where the first PEI includes first indication information and second indication information, the first indication information is indication information corresponding to the first subgroup, and the second indication information is indication information corresponding to the second subgroup; and a detection module, configured to detect the first indication information and/or the second indication information.

According to an eighth aspect, a wireless communications apparatus is provided, where the wireless communications apparatus is a base station and includes: a communication module, configured to send first PEI, where a first terminal device belongs to a first subgroup and a second subgroup, the first subgroup is configured to receive a CN-initiated paging message, the second subgroup is configured to receive a RAN-initiated paging message, where the first PEI includes first indication information and second indication information, the first indication information is indication information corresponding to the first subgroup, and the second indication information is indication information corresponding to the second subgroup; and a determining module, configured to determine that the first terminal device detects the first indication information and/or the second indication information.

According to a ninth aspect, a wireless communication apparatus is provided, and the apparatus includes a memory and a processor, where the memory is configured to store a program, and the processor is configured to call the program in the memory to perform the method according to any one of the first aspect to the fourth aspect.

According to a tenth aspect, an apparatus is provided, and the apparatus includes a processor configured to call a program from a memory to perform the method according to any one of the first aspect to the fourth aspect.

According to an eleventh aspect, a chip is provided, where the chip includes a processor configured to call a program from a memory to cause a device installed with the chip to perform the method according to any one of the first aspect to the fourth aspect.

According to a twelfth aspect, a computer-readable storage medium is provided, and the computer-readable storage medium stores a program that causes a computer to perform the method according to any one of the first aspect to the fourth aspect.

According to a thirteenth aspect, a computer program product is provided, and the computer program product includes a program that causes a computer to perform the method according to any one of the first aspect to the fourth aspect.

According to a fourteenth aspect, a computer program is provided, where the computer program causes a computer to perform the method according to any one of the first aspect to the fourth aspect.

DETAILED DESCRIPTIONS OF THE EMBODIMENTS

Communications System Architecture

Figure 1A:
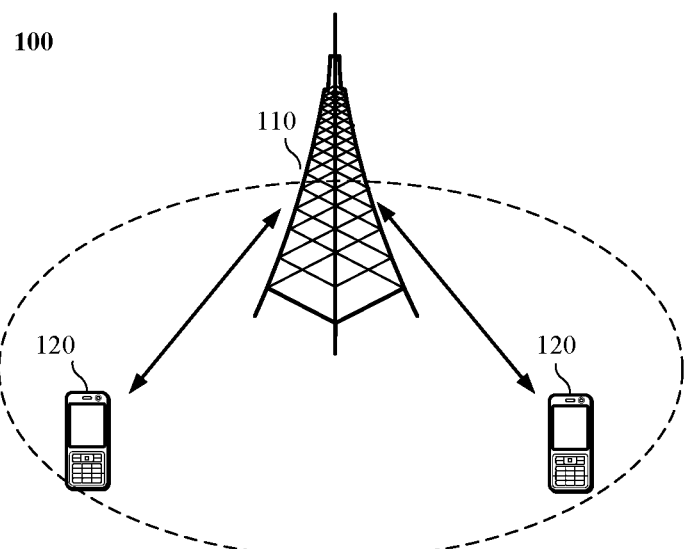
FIG. 1A, FIG. 1B and FIG. 1C are the diagrams of a system architecture of a communications system to which an embodiment of the present application is applicable.

Technical solutions of embodiments of the present application may be applied to various communications systems such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), wireless fidelity (Wi-Fi), a 5th-generation (5G) communications system or another communications system, for example, a future communications system, such as a 6th generation mobile communications system and a satellite communications system.

Generally, conventional communications systems support a limited number of connections and are also easy to implement. However, with the development of communication technologies, mobile communications systems will not only support conventional communication, but will also support, for example, device to device (D2D) communication, machine to machine (M2M) communication, machine type communication (MTC), vehicle to vehicle (V2V) communication, or vehicle-to-everything (V2X) communication, and the embodiments of the present application may also be applied to these communications systems.

A communications system in the embodiments of the present application may be applied to a carrier aggregation (CA) scenario, a dual connectivity (DC) scenario, or a standalone (SA) networking scenario.

A communications system in the embodiments of the present application may be applied to an unlicensed spectrum, where the unlicensed spectrum may also be considered as a shared spectrum. Alternatively, the communications system in the embodiment of the present application may be applied to a licensed spectrum, where the licensed spectrum may also be considered as a dedicated spectrum.

The embodiments of the present application may be applied to an NTN system or to a terrestrial network (TN) system. As an example rather than limitation, an NTN system may include an NR-based NTN system and an IoT-based NTN system.

Various embodiments of the present application are described in combination with a network device and a terminal device, where the terminal device may also be referred to as a user equipment (UE), an access terminal, a subscriber unit, a subscriber station, a mobile, a mobile station (MS), a mobile terminal (MT), a remote station, a remote terminal, a mobile device, a user terminal, a terminal, a wireless communications device, a user agent, a user apparatus, or the like.

In the embodiments of the present application, the terminal device may be a STATION (ST) in a WLAN, or may be a cellular phone, a cordless phone, a session initiation protocol (SIP) phone, a wireless local loop (WLL) station, a personal digital assistant (PDA) device, a handheld device having a wireless communication function, a computing device or any other processing device connected to a wireless modem, a vehicle-mounted device, a wearable device, a terminal device in a next generation communications system such as an NR network or a future evolved public land mobile network (PLMN), or the like.

In the embodiments of the present application, the terminal device may be a device providing a user with voice and/or data connectivity and capable of connecting people, objects, and machines, such as a handheld device or vehicle-mounted device having a wireless connection function. The terminal device in the embodiments of the present application may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the terminal device may be used to act as a base station. For example, the terminal device may act as a scheduling entity, which provides a sidelink signal between terminal devices in V2X or D2D, or the like. For example, a cellular phone and a vehicle communicate with each other using a sidelink signal. A cellular phone and a smart home device communicate with each other, without a relay of a communication signal through a base station.

In the embodiments of the present application, the terminal device may be deployed on land, including indoor or outdoor, handheld, wearable or vehicle-mounted; or may be deployed on water (for example, on a ship); or may be deployed in the air (for example, on an airplane, a balloon, and a satellite).

In the embodiments of the present application, the terminal device may be a mobile phone, a tablet computer (Pad), a computer having a wireless receive and transmit function, a virtual reality (VR) terminal device, an augmented reality (AR) terminal device, a wireless terminal device in industrial control, a wireless terminal device in self driving, a wireless terminal device in remote medical surgery, a wireless terminal device in a smart grid, a wireless terminal device in transportation safety, a wireless terminal device in a smart city, a wireless terminal device in a smart home, or the like. The terminal device in the embodiments of the present application may also be referred to as a terminal, a user equipment (UE), an access terminal device, a vehicle-mounted terminal, an industrial control terminal, a UE unit, a UE station, a mobile, a mobile station, a remote station, a remote terminal device, a mobile device, a UE terminal device, a wireless communications device, a UE proxy, a UE apparatus, or the like. The terminal device may also be fixed or mobile.

As an example rather than limitation, in the embodiment of the present application, the terminal device may alternatively be a wearable device. The wearable device may also be referred to as an intelligent wearable device, and is a general term for wearable devices such as glasses, gloves, watches, clothes, and shoes that are intelligently designed and developed based on daily wearing by using a wearable technology. The wearable device is a portable device that is worn directly on the body, or integrated into clothing or accessories of a user. The wearable device is not only a hardware device, but also implements a powerful function through software support, data interaction and cloud interaction. A generalized wearable smart device includes a fully functional and large-sized device that may not rely on a smartphone for implementing full or partial functions, such as a smart watch or smart glasses, as well as a device focusing only on a specific application function and required to be used in cooperation with another device such as a smartphone, for example, various smart bracelets or smart jewelry for sign monitoring.

The network device in the embodiments of the present application may be a device for communicating with the terminal device. The network device may also be referred to as an access network device or a wireless access network device. For example, the network device may be a base station. The network device in the embodiments of the present application may be a RAN node (or device) that connects the terminal device to a wireless network. The base station may broadly cover the following various names, or may be interchangeable with the following names, for example, a NodeB, an evolved NodeB (eNB), a next generation NodeB (gNB), a relay station, an access point, a transmitting and receiving point (TRP), a transmitting point (TP), a master eNB (MeNB), a secondary eNB (SeNB), a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in device to device (D2D), vehicle-to-everything (V2X), and machine-to-machine (M2M) communications, a network-side device in a 6G network, a device that functions as a base station in a future communications system, or the like. The base station may support networks of the same or different access technologies. A specific technology and specific device form used by the network device are not limited in the embodiments of the present application.

The base station may be fixed or mobile. For example, a helicopter or drone may be configured to act as a mobile base station, and one or more cells may move according to the position of the mobile base station. In other examples, a helicopter or drone may be configured to serve as a device in communication with another base station.

In some deployments, the network device in the embodiments of the present application may be a CU or a DU, or the network device includes a CU and a DU. The gNB may further include an AAU.

The network device and the terminal device may be deployed on land, including indoor or outdoor, handheld or vehicle-mounted; or may be deployed on water; or may be deployed on an airplane, a balloon, and a satellite in the air. In the embodiments of the present application, a scenario where the network device and the terminal device are located is not limited.

As an example rather than limitation, in the embodiment of the present application, the network device may have a mobile feature, for example, the network device may be a movable device. In some embodiments of the present application, the network device may be a satellite, or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. In some embodiments of the present application, the network device may alternatively be a base station located on land, water, or the like.

In the embodiment of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell. The small cell herein may include: a metro cell, a micro cell, a pico cell, a femto cell, or the like. These small cells feature small coverage and low transmit power, and are suitable for providing a high-speed data transmission service.

Exemplarily, FIG. 1A is a schematic diagram of an architecture of a communications system according to an embodiment of the present application. As shown in FIG. 1A, a communications system 100 may include a network device 110, and the network device 110 may be a device that communicates with a terminal device 120 (or referred to as a communications terminal or a terminal). The network device 110 may provide communication coverage for a specific geographic area, and may communicate with a terminal device located within the coverage.

FIG. 1A exemplarily shows one network device and two terminal devices. In some embodiments of the present application, the communications system 100 may include a plurality of network devices, and another quantity of terminal devices may be included in coverage of each network device, which is not limited in the embodiments of the present application.

Figure 1B:
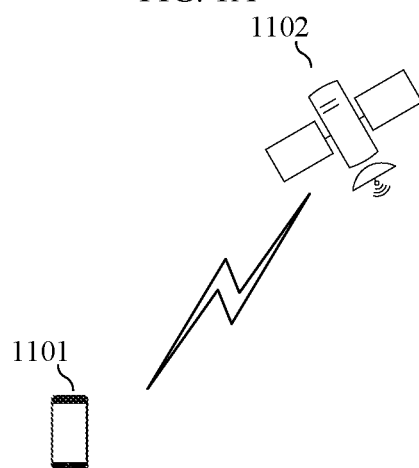

Exemplarily, FIG. 1B is a schematic diagram of an architecture of another communications system according to an embodiment of the present application. Referring to FIG. 1B, a terminal device 1101 and a satellite 1102 are included, and wireless communication may be performed between the terminal device 1101 and the satellite 1102. A network formed between the terminal device 1101 and the satellite 1102 may also be referred to as an NTN. In the architecture of the communications system shown in FIG. 1B, the satellite 1102 may have a function of a base station, and direct communication may be performed between the terminal device 1101 and the satellite 1102. In this system architecture, the satellite 1102 may be referred to as a network device. In some embodiments of the present application, the communications system may include a plurality of network devices 1102, and another quantity of terminal devices may be included in coverage of each network device 1102, which is not limited in the embodiments of the present application.

Figure 1C:
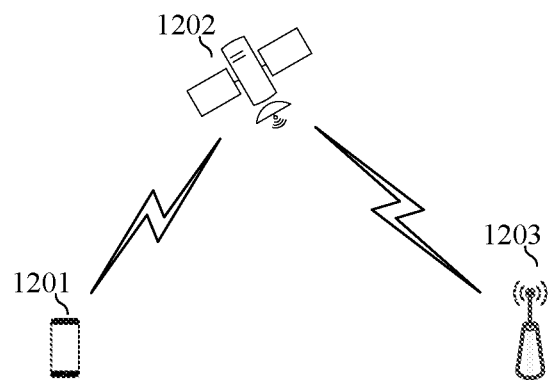

Exemplarily, FIG. 1C is a schematic diagram of an architecture of another communications system according to an embodiment of the present application. Referring to FIG. 1C, a terminal device 1201, a satellite 1202, and a base station 1203 are included, wireless communication may be performed between the terminal device 1201 and the satellite 1202, and communication may be performed between the satellite 1202 and the base station 1203. A network formed between the terminal device 1201, the satellite 1202, and the base station 1203 may also be referred to as an NTN. In the architecture of the communications system shown in FIG. 1C, the satellite 1202 may not have a function of a base station, and communication between the terminal device 1201 and the base station 1203 needs to be transferred through the satellite 1202. In this system architecture, the base station 1203 may be referred to as a network device. In some embodiments of the present application, the communications system may include a plurality of network devices 1203, and another quantity of terminal devices may be included in coverage of each network device 1203, which is not limited in the embodiments of the present application.

It should be noted that, FIG. 1A to FIG. 1C illustrates the systems to which the present application applies by way of example only. Certainly, the method illustrated in the embodiments of the present application may further be applied to another system, such as a 5G communications system and an LTE communications system, which is not specifically limited in the embodiments of the present application.

In some embodiments of the present application, the wireless communications systems shown in FIG. 1A to FIG. 1C may further include other network entities such as a mobility management entity (MME) and an access and mobility management function (AMF), which is not limited in the embodiments of the present application.

It should be understood that a device having a communication function in a network/system in the embodiments of the present application may be referred to as a communications device. The communications system 100 shown in FIG. 1A is used as an example, a communications device may include a network device 110 and a terminal device 120 having a communication function, the network device 110 and the terminal device 120 may be specific devices described above, and details are not described herein, and a communications device may further include other devices in the communications system 100, such as a network controller, a mobility management entity, and other network entities, which is not limited in the embodiments of the present application.

It should be understood that, "indicate" mentioned in the embodiments of the present application may refer to a direct indication, or may refer to an indirect indication, or may mean that there is an association relationship. For example, A indicates B, which may mean that A directly indicates B, for example, B may be obtained by A; or may mean that A indirectly indicates B, for example, A indicates C, and B may be obtained by C; or may mean that there is an association relationship between A and B.

In description of the embodiments of the present application, the term "corresponding" may mean that there is a direct or indirect correspondence between the two, or may mean that there is an association relationship between the two, or may mean that there is a relationship such as indicating and being indicated, or configuring and being configured.

The term "configuration" in the embodiments of the present application may include configuration performed by at least one of a system message, RRC signaling, and a media access control control element (MAC CE).

In some embodiments of the present application, "predefined" or "preset" may be implemented by pre-storing corresponding codes, tables, or other forms that may be used to indicate related information in devices (for example, including the terminal device and the network device), and a specific implementation thereof is not limited in the present application. For example, predefined may refer to defined in a protocol.

In some embodiments of the present application, the "protocol" may refer to a standard protocol in the communications field, and may include, for example, an LTE protocol, an NR protocol, and a related protocol applied to a future communications system, which is not limited in the present application.

For ease of understanding, some related technical knowledge related to the embodiments of the present application is first introduced. The following related technologies, as optional solutions, and the technical solutions of the embodiments of the present application, may be randomly combined, all of which fall within the protection scope of the embodiments of the present application. The embodiments of the present application include at least part of the following content.

RRC State

Some communications systems (such as an NR system) introduce the following three states for RRC: an RRC idle state (RRC_IDLE state), an RRC inactive state (RRC_I-

NACTIVE state), and an RRC connected state (RRC_CONNECTED state). The foregoing three states reflect a connection status of a terminal device, a base station and a CN.

A terminal device in an RRC idle state has no RRC context on a network side, which is to say, a parameter necessary for communication between the network side and the terminal device does not belong to a specific cell, and the network side does not know whether the terminal device exists or not. A set of tracking area identifier (TAI) lists is assigned to the terminal device. From the perspective of the core network, a connection between a RAN side and the core network is disconnected. To reduce power consumption, the terminal device is in a dormant state most of the time, thus failing to perform data transmission. In downlink, the terminal device in an RRC idle state may be periodically woken up to receive a paging message (if any) from the network side. Mobility may be handled by the terminal device through cell reselection. In the RRC idle state, the terminal device and the network side do not maintain uplink synchronization. If the terminal device is to be switched from the RRC idle state to the RRC connected state, RRC context can be established between the terminal device and the network side only through random access.

In the RRC connected state, RRC context may be established, and all parameters required for communication are known to both entities (the terminal device and the network side). From the perspective of the core network, the terminal device is in a state of being connected to the core network. A cell to which the terminal device belongs is known and has been configured with a device identity, namely, a cell-radio network temporary identity (C-RNTI), for transmission of signaling between the terminal device and a network. Data may be transmitted in the RRC connected state; however, since data flow is usually burst, when there is no data flow for transmission, power consumption may be reduced by turning off a receiving circuit of the terminal device by using the discontinuous reception (DRX) technology. Since the RRC context has been established in the base station in the connected state, leaving DRX and starting to receive/transmit data is relatively fast. In the connected state, mobility may be controlled by the network side, that is, the terminal device provides neighboring cell measurement for the network, and the network instructs the device to perform handover. Uplink time synchronization may or may not be present. When there is data for transmission, uplink synchronization may be established by using random access.

In LTE, only the RRC idle state and the RRC connected state are supported. It is common in practice to use the RRC idle state as a primary sleep state of the terminal device to save power. However, since frequent transmission of small data packets often occurs on some terminal devices, there may be a large quantity of transitions from the RRC idle state to the RRC connected state in the LTE mode. These transitions cause an increase in signaling load and signaling delay. Therefore, to reduce the signaling load and waiting time, an RRC inactive state is introduced in NR.

In the RRC inactive state, RRC context of a network side and a terminal device side is maintained. From the perspective of a core network, a RAN side is connected to the core network. Therefore, a transition from the inactive state to the connected state is fast, without requiring signaling from the core network. Meanwhile, the terminal device is allowed to be dormant in a manner that likes in an RRC idle state, and the mobility is handled through cell reselection. Therefore, the RRC inactive state may be considered as a mixture of the idle state and the connected state. In addition, the terminal device may perform a positioning measurement mentioned above in the RRC inactive state. When the positioning measurement is performed in the RRC inactive state, the terminal device does not need to transition to the RRC connected state, thereby reducing overheads and delay.

As may be seen from the foregoing description, an important difference between different RRC states lies in mobility mechanisms. Efficient mobility processing is a key part of any mobile communications system. For the RRC idle state and RRC inactive state, mobility is handled by the terminal device through cell reselection, and for the RRC connected state, mobility is handled by the network side based on measurements of the terminal device.

Paging

For a terminal device in an RRC idle state or an RRC inactive state, the terminal device may be transitioned to an RRC connected state by paging. A paging process may be triggered by a core network side to send a paging request to a terminal device in an RRC idle state or an RRC inactive state. Alternatively, paging may be triggered by an access network side to notify a terminal device in an inactive state to initiate a connection restoration process, or to instruct terminal devices in all states covered by the access network to receive system information update, or to instruct terminal devices in all states covered by the access network to receive alarm information sent by an earthquake and tsunami warning system (ETWS) and the commercial mobile alert system (CMAS).

Figure 2:
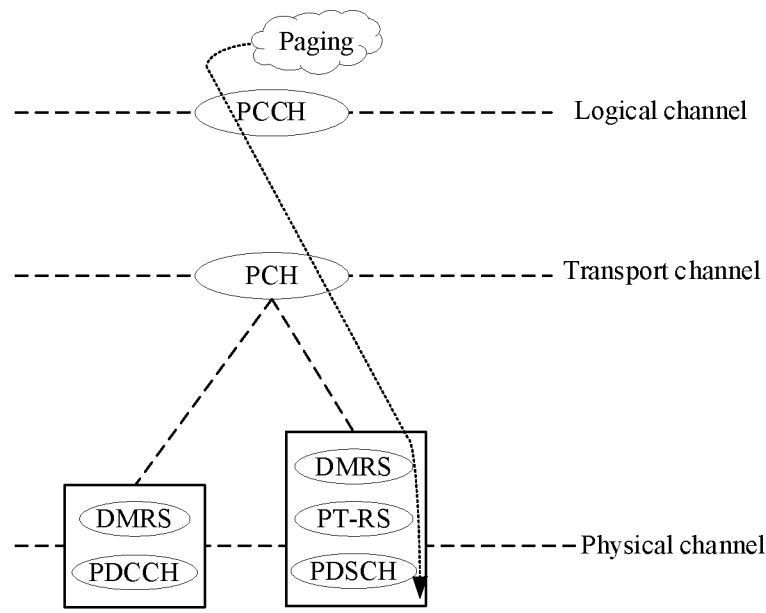
FIG. 2 is a logic diagram of paging.

FIG. 2 is a logic diagram of paging. As may be learned from FIG. 2, an entire paging process is mapped from a logical channel to a transport channel, and finally to a physical channel. A demodulation reference signal (DMRS) may be used for demodulation of uplink and downlink data.

The paging process may be initiated by a CN or initiated by a RAN (or a base station). A CN-initiated process is used as an example, the process may be initiated by an access and mobility management function (AMF) in the CN. If a paging message is initiated by the CN, a core network device sends the paging message to all base stations in a tracking area (TA) registered by the terminal device. After receiving the paging message sent by the core network device, the base stations interpret contents of the paging message to obtain a tracking area identity (TAI) list of paged terminal devices, and perform air interface paging in a cell that belongs to a tracking area in the list. Generally, to reduce overheads of transmitting the paging message, after receiving the paging message sent by the core network device, the base station may aggregate paging messages corresponding to terminal devices having a same PO into one paging message, and finally transmit the paging message to related terminal devices through a paging channel. After receiving the paging message, a terminal device in an RRC idle state may initiate an RRC connection setup process to receive data or signaling.

The paging message is carried over a physical downlink shared channel (PDSCH). Before receiving the paging message, the terminal device needs to first receive a paging parameter through a system message, and then calculate a frame number of a paging frame (PF) in which the paging message is located and a PO in combination with its own UE_ID. Then, the terminal device listens to, in the PO on the PF, a physical downlink control channel (PDCCH) scrambled by a paging-radio network temporary identity (P-RNTI) to receive paging indication information, and finally receives the paging message based on the paging indication information. It may be understood that the paging indication information is carried over the PDCCH, and the paging message may be used to indicate a resource location of a PDSCH that carries the paging message.

For example, the terminal device may detect a PDCCH in the PO to obtain downlink control information (DCI), and cyclic redundancy check (CRC) of the DCI is scrambled by the P-RNTI. If the DCI is detected, the terminal device may receive the PDSCH at a resource location (for example, a time domain resource location and/or a frequency domain resource location) indicated by the DCI. The terminal device may decode the PDSCH by using a temporary mobile subscriber identity (TMSI) (for example, 5G-S-TMSI). If the decoding is successful, it indicates that the terminal device is paged and the terminal device obtains the paging message from the PDSCH. If the decoding fails, it indicates that the terminal device is not paged.

Figure 3:
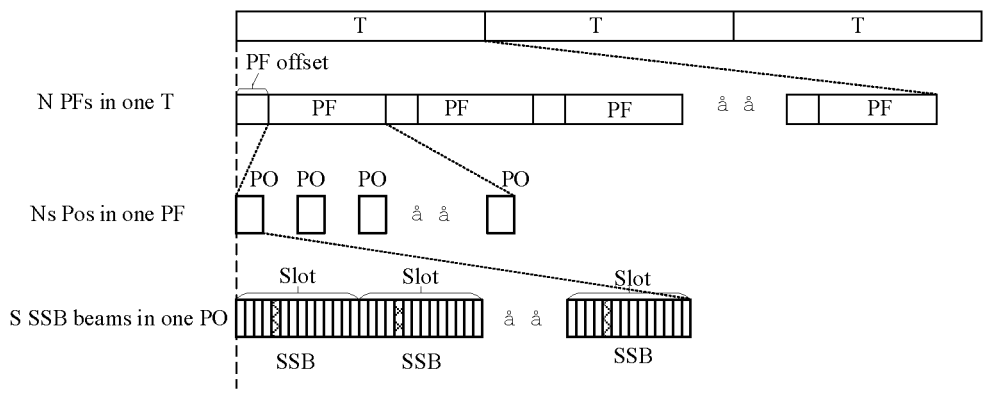
FIG. 3 is a schematic diagram of a relationship between a paging frame and a paging occasion in a paging cycle.

The PF above indicates a frame number of a system frame at which the paging message should appear, and the PO indicates a time at which the paging message may appear. FIG. 3 shows a location of a PF in a DRX cycle and a location of a PO in a PF. As shown in FIG. 3, a PF is located within a DRX cycle (or paging cycle) T, one paging cycle includes N PFs, one PF includes Ns POs, and one PO includes S slots or synchronization signal block (SSB) beams, where N, Ns, and S are all positive integers. A plurality of POs in a paging cycle may correspond to different terminal devices. However, for a specific terminal device, in one paging cycle, the terminal device only needs to monitor its own PO.

As described above, the terminal device may calculate a PF and a PO based on a UE identity (ID). In some implementations, a system frame corresponding to a system frame number (SFN) satisfying the formula (SFN+PF_offset) mod T=(T div N)*(UE_ID mod N) may be used as a PF, and within the PF, an index i_s of the PO corresponding to the terminal device may be calculated based on the formula i_s=floor (UE_ID/N) mod Ns. T denotes a cycle length of a paging cycle of the terminal device. UE_ID is used to identify a terminal device. N denotes a quantity of PFs within a paging cycle. Ns denotes a quantity of POs within one PF. PF_offset denotes a frame offset of the PF.

It should be noted that, for a terminal device, if a default DRX cycle is different from a DRX cycle configured for the terminal device, a cycle length of the shorter DRX cycle of the two DRX cycles may be selected as the above-mentioned T. That is, T=min(T_UE, T_sib), where T_sib denotes a cycle length of the default DRX cycle indicated in a system message, and T_UE denotes a cycle length of the DRX cycle configured for the terminal device. Certainly, for a terminal device that is not configured with T_UE, the cycle length of the default DRX cycle indicated in the system message may be used as a value of T, that is, T=T_sib.

It should also be noted that, the UE_ID above may be calculated by the formula UE_ID=(5G-S-TMSI mod 1024), where 5G-S-TMSI denotes a TMSI allocated by a communications system to a terminal device.

In addition, in the NR technology, for a terminal device in an RRC idle state, a network device does not know which transmit beam should be used to send a paging message to the terminal device. To ensure that the terminal device may receive the paging message, the network device sends the paging message in a beam sweeping manner. To support multi-beam transmission of the paging message, the PO may be defined as a group of PDCCH monitoring occasions, and different PDCCH monitoring occasions correspond to paging indication information sent through different transmit beams. One PF may include one or more POs or starting time points of a PO.

Since each SSB index corresponds to a PDCCH monitoring occasion, and different SSB indexes correspond to different beams, a plurality of PDCCH monitoring occasions in one PO may be associated with transmit beams corresponding to different SSB indexes to support multi-beam transmission of the paging message, and the messages transmitted on each SSB beam are identical. Generally, SSBs required to complete one time of beam sweeping constitute an SSB burst. PDCCH monitoring occasions are a series of time domain locations determined by a paging search space.

The PDCCH monitoring occasions start numbering from the first PDCCH monitoring occasion of a PF, and the numbering ends before a next PF. A PO includes a set of S consecutive PDCCH monitoring occasions, where S is a quantity of actual transmitted SSBs. A number of a start PDCCH monitoring occasion of each PO may be determined by a parameter firstPDCCH-MonitoringOccasionOfPO. If this parameter exists, the number of the start PDCCH monitoring occasion of the $(i\_s+1)^{th}$ PO is the $(i\_s+1)^{th}$ value of the parameter. If this parameter does not exist, all PDCCH monitoring occasions sequentially constitute POs one by one, and the number of the start PDCCH monitoring occasion of the $(i\_s+1)^{th}$ PO is $i\_s*S$.

It should also be noted that, PDCCH monitoring occasions constituting one PO may be located in one PF or in two PFs, that is, the PDCCH monitoring occasions included in one PO may be cross-frame.

Based on the foregoing description, it may be learned that a terminal device periodically monitors, with a paging cycle as a cycle, a PDCCH in a PO in a manner similar to the DRX mechanism to obtain paging indication information. However, some terminal devices may not be paged for a long time, but still need to keep awake periodically to monitor a PDCCH that possibly carries paging indication information. There is room for further optimization of a power saving manner for such terminal devices.

PEI

In POs configured for a terminal device, only about 10% of the POs transmit paging messages, and there is no information useful to the terminal device in the remaining POs. That is to say, paging detection performed by the terminal device for the remaining 90% of the POs is only wasting power. Before paging detection, some communications systems (such as NR Rel-17) support transmission of PEI. The PEI may be carried in DCI. The PEI may be used to indicate whether there is a paging message for the terminal device subsequently. The terminal device may determine, based on the PEI, whether to perform detection of a paging message or to continue to sleep in a subsequent PO. The introduction of PEI may reduce power consumption of the terminal device.

PEI is indicated in a unit of subgroup (subgroup refers to a group of terminal devices). For example, terminal devices sharing a PO may be first divided into a plurality of subgroups. The PEI includes indication information (or bits) corresponding to each of one or more subgroups. The indication information corresponding to each subgroup may be used to indicate whether terminal devices in the subgroup perform detection of a paging message or continue to sleep in a subsequent PO. The terminal devices may find corresponding indication information in the PEI according to a subgroup sequence number of respective terminal devices, and then determine, based on indication of the indication information, whether detection of a paging message needs to be performed subsequently.

On the basis of the introduction of the foregoing concepts, embodiments of the present application are described in detail below.

Embodiment 1

When a terminal device is in an RRC idle state, the terminal device only needs to detect CN-initiated paging (hereinafter, the CN-initiated paging is sometimes referred to as CN-side paging for short). When a terminal device is in an RRC inactive state, the terminal device not only needs to detect the CN-initiated paging, but also needs to detect RAN-initiated paging (hereinafter, the RAN-initiated paging is sometimes referred to as RAN-side paging). Thus, a terminal device in an RRC inactive state is generally more likely to be paged than a terminal device in an RRC idle state. A terminal device cannot distinguish RAN-initiated paging from CN-initiated paging, and thus a terminal device in an RRC idle state receives unnecessary RAN-side paging, thereby causing unnecessary power consumption. Compared to terminal devices in an RRC inactive state, a quantity of terminal devices in an RRC idle state may be quite large. Therefore, if the terminal devices in the RRC idle state can be prevented from receiving unnecessary RAN-side paging, a large amount of power saving gain of the terminal devices in the RRC idle state may be realized.

In view of the foregoing problem, Embodiment 1 provided in the present application is described in detail below in combination with FIG. 4.

Figure 4:
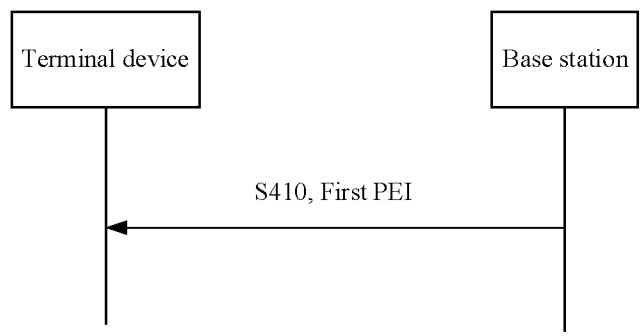
FIG. 4 is a schematic flowchart of a wireless communication method according to an embodiment of the present application.

FIG. 4 is a schematic flowchart of a wireless communication method according to Embodiment 1. The method 400 illustrated in FIG. 4 may be performed by a first terminal device and a base station. The first terminal device and base station may be any type of terminal device and base station mentioned above. The first terminal device may be a terminal device in an RRC idle state, or may be a terminal device in an RRC inactive state.

Referring to FIG. 4, in Step S410, the first terminal device receives first PEI. The first PEI corresponds to at least one PO (for example, a group of POs). Alternatively, the first PEI is used to indicate whether a paging message of the first terminal device or of a subgroup in which the first terminal device is located is included in the at least one PO.

Before Step S410, the method illustrated in FIG. 4 may further include that the first terminal device receives or derives its subgroup sequence number. For example, if a CN chooses to allocate subgroup information of the first terminal device based on a feature of the first terminal device, the subgroup sequence number of the first terminal device is provided by non-access stratum (NAS) signaling during registration of the first terminal device. For another example, if the CN chooses not to provide specific subgroup information, the subgroup sequence number may be calculated based on UE_ID of the first terminal device for randomization. After the first terminal device receives or derives its subgroup sequence number, the first terminal device may decode a quantity of subgroups in the PO from system information block-X (SIB-X). The first terminal device may then decode a quantity of POs associated with one piece of PEI from the SIB-X. Then, the first terminal device may determine a PDCCH-based PEI resource and a monitoring occasion, and determine a corresponding position of a subgroup in the PDCCH-based PEI. On the basis of the foregoing steps, the first terminal device may continue to perform Step S410 in FIG. 4, so as to obtain indication information for the subgroup from the first PEI to determine whether the paging message of the first terminal device is included in the PO corresponding to the first PEI.

The first PEI may be associated with first information. The first information may be used to determine (or indicate) that a paging message in the at least one PO is a RAN-initiated paging message or a CN-initiated paging message. The first information may be implemented in a plurality of ways. For example, the first indication information may directly indicate a type of the paging message, or may indirectly indicate a type of the paging message by indicating other information. The first indication information may indicate one or more of the following information: that the paging message corresponding to the first PEI is a CN-side paging, a RAN-side paging, or including both the CN-side paging and the RAN-side paging. Alternatively, the first indication information may indicate one or more of the following information: that paging messages corresponding to the first PEI are all RAN-initiated paging messages; or the first information indicates that paging messages corresponding to the first PEI include a CN-initiated paging message. Detailed forms and indication manners of the first information are illustrated in more detail below in combination with Embodiments 1.1 to 1.4.

Embodiment 1.1

The first information may be used to determine or indicate a first information field and a second information field that are in the first PEI. The first information field is corresponding to the CN-initiated paging message, and the second information field is corresponding to the RAN-initiated paging message. In other words, indication information in the first information field is used to indicate whether the CN-initiated paging message is included in the PO corresponding to the first PEI; and indication information in the second information field is used to indicate whether the RAN-initiated paging message is included in the PO corresponding to the first PEI.

In some embodiments, the first information field and the second information field may be arranged in sequence in the first PEI. For example, in the first PEI, the first information field may be located before the second information field. For another example, in the first PEI, the first information field may be located after the second information field. Certainly, in some other embodiments, the first information field and the second information field may be interleaved in the first PEI according to a specific rule.

In some embodiments, the first information may include second information. The second information may indicate a quantity of subgroups in the first information field and/or a quantity of subgroups in the second information field. The subgroup in the first information field is a subgroup for receiving paging messages that includes a CN-initiated paging message. The subgroup in the second information field is a subgroup for receiving a RAN-initiated paging message.

In some embodiments, the second information is determined based on a SIB message. That is to say, the SIB message may be used to inform the first terminal device of the quantity of subgroups in the first information field and/or the quantity of subgroups in the second information field. Alternatively, the second information may be predefined by a protocol.

In some embodiments, the first information may include third information. The third information may indicate a sequence of the first information field and the second information field in the first PEI. For example, the third information indicates that the first information field is located before the second information field. For another example, the third information indicates that the first information field is located after the second information field.

In some embodiments, the third information may be determined based on a SIB message. That is to say, the SIB message may be used to inform the first terminal device of the sequence of the first information field and the second information field in the first PEI. Alternatively, the third information may be predefined by a protocol. That is to say, the sequence of the first information field and the second information field in the first PEI may be predefined by a protocol.

In some embodiments, if the first terminal device is in an RRC inactive state, a subgroup sequence number (or a bit sequence) of the first terminal device in the first PEI is as follows:

$$\text{floor}\left[\frac{UE_{ID}}{N*Ns}\right] \bmod G_2 + G_1$$

where $UE_{ID}$ denotes an identity of the first terminal device, N denotes a quantity of paging frames in a paging cycle, Ns denotes a quantity of paging occasions in a paging frame, $G_1$ denotes a quantity of subgroups in the first information field, $G_2$ denotes a quantity of subgroups in the second information field, floor denotes a floor operation, and mod denotes a modulo operation. A first bit in the first information field may be a bit corresponding to a subgroup whose subgroup sequence number is 0. When a PEI subgroup sequence number of a terminal device is determined through $UE_{ID}$, according to the formula in the embodiment, terminal devices may be evenly distributed in each subgroup, so that PEI indication performance of the worst subgroup is improved, and PEI indication efficiency is improved.

In some embodiments, if the first terminal device is in an RRC idle state, the first terminal device reads only information in the first information field, that is, the first terminal device reads only information in an information field corresponding to CN-side paging. In this way, even if the PO corresponding to the first PEI includes RAN-side paging, a terminal device in the RRC idle state is not affected or woken up for subsequent paging detection, thereby reducing power consumption of the terminal device.

If a terminal device is in an RRC inactive state, the terminal device may receive the CN-side paging, or may receive the RAN-side paging. When a paging message is transmitted over an air interface, paging messages that overlap in time domain are aggregated into one piece of paging message by a RAN and transmitted over a same paging channel. Thus, in some embodiments, it may be specified (as predefined by a protocol) that indication information for a subgroup to which the terminal device in the RRC inactive state belongs is located in the first information field of the first PEI (namely, the information field corresponding to the CN-side paging). Alternatively, for the terminal device in the RRC inactive state, subgroup indication information in the first information field of the first PEI is valid indication information, and subgroup indication in the second information field of the first PEI is invalid indication information.

In some other embodiments, it may be specified (as predefined by a protocol) that indication information for a subgroup to which the terminal device in the RRC inactive state belongs is located in the second information field of the first PEI (namely, the information field corresponding to the RAN-side paging). Alternatively, for the terminal device in the RRC inactive state, subgroup indication information in the second information field of the first PEI is valid indication information, and subgroup indication in the first information field of the first PEI is invalid indication information. In this way, there are two major benefits as follows. First, a terminal device in an RRC inactive state is generally more likely to be paged than a terminal device in an RRC idle state. If the terminal device in the RRC idle state and the terminal device in the RRC inactive state are located in one subgroup, a probability that the terminal device in the RRC idle state is falsely woken up is increased. RAN-side paging is higher in frequency than CN-side paging, and when the RAN-side paging and the CN-side paging are respectively indicated, a terminal device receiving only the CN-side paging (namely, a terminal device in the RRC idle state) may be prevented from being woken up by the RAN-side paging. Second, when the terminal device is in the RRC inactive state, the terminal device may belong to two different subgroups, and therefore one piece of PEI may include indication information for both two subgroups. The foregoing solution is equivalent to clarifying a position of the valid indication information in the PEI when the terminal device has indication information for two subgroups, so as to avoid inconsistency of understanding between a base station and the terminal device.

In some embodiments, in subgroups indicated by the first PEI, a terminal device in an RRC idle state and a terminal device in an RRC inactive state belong to different subgroups. The terminal device in the RRC inactive state is generally more likely to be paged than the terminal device in the RRC idle state. If a subgroup includes a terminal device in the RRC inactive state and a terminal device in the RRC idle state, a probability that the terminal devices in the subgroup are paged is increased. In the foregoing embodiment, a terminal device in the RRC inactive state and a terminal device in the RRC idle state are assigned to different subgroups, so that the terminal device in the RRC idle state is prevented from being woken up by paging of the terminal device in the RRC inactive state.

Embodiment 1.2

The first information is carried by at least one bit of the first PEI. For example, one or more bits may be added to the first PEI to indicate a type of a paging message in a PO corresponding to the first PEI. For example, if a value of the at least one bit is a first value, paging messages corresponding to the first PEI are all RAN-initiated paging messages. For another example, if a value of the at least one bit is a second value, paging messages corresponding to the first PEI include a CN-initiated paging message.

In a specific example, a new bit may be added to the first PEI. When a value of the new bit is 1, it may indicate that all pages in the PO corresponding to the first PEI are RAN-side pages. When a value of the new bit is 0, it may indicate that a CN-initiated paging message is included in the PO corresponding to the first PEI.

Embodiment 1.3

The first information is an RNTI for scrambling the first PEI. That is to say, the first PEI may be scrambled by using different RNTIs to indicate the type of the paging message in the PO corresponding to the first PEI. For example, if the first PEI is scrambled by using a first RNTI, paging messages corresponding to the first PEI are all RAN-initiated paging messages. For another example, if the first PEI is scrambled by using a second RNTI, paging messages corresponding to the first PEI include a CN-initiated paging message.

Benefits of the foregoing implementation of the first information lie in that: In many cases, a terminal device learns the type of the paging message in the PO corresponding to the first PEI after completion of CRC. For a terminal device in an RRC idle state, if learning through CRC that paging messages in the PO corresponding to the first PEI are all RAN-side paging, the terminal device does not need to parse information bits in the PEI.

Embodiment 1.4

The first information is DCI carrying the first PEI. That is to say, different DCI is used to indicate the type of the paging message in the PO corresponding to the first PEI. For example, if the DCI carrying the first PEI is first DCI, paging messages corresponding to the first PEI are all RAN-initiated paging messages. For another example, if the DCI carrying the first PEI is second DCI, paging messages corresponding to the first PEI include a CN-initiated paging message.

In some embodiments, if the first terminal device is in an RRC inactive state, the first terminal device reads the first DCI.

In some embodiments, if the first terminal device is in an RRC idle state, the first terminal device reads the second DCI.

The foregoing implementation of the first information may reduce detection complexity of the terminal device. This is because, in most cases, there is no CN-side paging or RAN-side paging in the PO corresponding to the first PEI, which means that, in most cases, PEI indicates all zeros. That is, bits of the DCI carrying the PEI are all zeros. For DCI with all zeros, the terminal device may perform detection in a sequence matching manner without decoding, and detection complexity is low.

Embodiment 2

Sometimes there is a case where a terminal device has two PEI subgroup sequence numbers in PEI. For example, the terminal device can receive both paging sent by a CN and paging sent by a RAN, and the paging sent by the CN and the paging sent by the RAN correspond to different PEI subgroup sequence numbers. For another example, the paging sent by the CN and the paging sent by the RAN have different paging cycles, and sometimes there is a case where CN-initiated paging and RAN-initiated paging overlap on some POs and correspond to different PEI subgroup sequence numbers. In this case, ambiguity occurs for the terminal device to understand the subgroup. For example, the terminal device does not know indication information corresponding to which subgroup is based for subsequent processing.

In view of the foregoing problem, Embodiment 2 provided in the present application is described in detail below in combination with FIG. 5.

Figure 5:
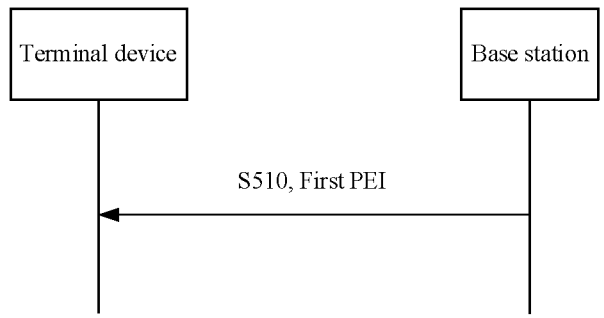
FIG. 5 is a schematic flowchart of a wireless communication method according to another embodiment of the present application.

FIG. 5 is a schematic flowchart of a wireless communication method according to Embodiment 2. A method 500 illustrated in FIG. 5 may be performed by a first terminal device and a base station. The first terminal device and the base station may be any type of terminal device and base station mentioned above. The first terminal device may be a terminal device in an RRC inactive state. The first terminal device may belong to both a first subgroup and a second subgroup. The first subgroup is configured to receive a CN-initiated paging message. The second subgroup is configured to receive a RAN-initiated paging message.

Referring to FIG. 5, in Step S510, the first terminal device receives first PEI. The first PEI may include first indication information and second indication information. The first indication information is indication information corresponding to the first subgroup. That is to say, the first indication information may be used to indicate whether a paging message of the first subgroup is included in a PO corresponding to the first PEI. The second indication information is indication information corresponding to the second subgroup. That is to say, the second indication information may be used to indicate whether a paging message of the second subgroup is included in the PO corresponding to the first PEI.

Before Step S510, the method illustrated in FIG. 5 may further include that the first terminal device receives or derives its subgroup sequence number. For example, if a CN chooses to allocate subgroup information of the first terminal device based on a feature of the first terminal device, the subgroup sequence number of the first terminal device is provided by NAS signaling during registration of the first terminal device. For another example, if the CN chooses not to provide specific subgroup information, the subgroup sequence number may be calculated based on UE_ID of the first terminal device for randomization. After the first terminal device receives or derives its subgroup sequence number, the first terminal device may decode a quantity of subgroups in the PO from SIB-X. The first terminal device may then decode a quantity of POs associated with one piece of PEI from the SIB-X. Then, the first terminal device may determine a PDCCH-based PEI resource and a monitoring occasion, and determine a corresponding position of a subgroup in the PDCCH-based PEI. On the basis of the foregoing steps, the first terminal device may continue to perform Step S510 in FIG. 5, so as to obtain indication information for the subgroup from the first PEI to determine whether the paging message of the first terminal device is included in the PO corresponding to the first PEI.

In Step S520, the first terminal device detects the first indication information and/or the second indication information.

In some embodiments, the first terminal device may detect the first indication information, and not detect the second indication information. Further, in some embodiments, that the first terminal device detects the first indication information, and does not detect the second indication information may be predefined by a protocol or indicated by higher layer signaling.

In some embodiments, the first terminal device may detect the second indication information, and not detect the first indication information. Further, in some embodiments, that the first terminal device detects the second indication information, and does not detect the first indication information may be predefined by a protocol or indicated by higher layer signaling.

In some embodiments, the first terminal device may detect both the first indication information and the second indication information.

In an example, if at least one of the first indication information and the second indication information indicates that the first terminal device needs to detect the PO corresponding to the first PEI, the first terminal device detects the PO corresponding to the first PEI. In this way, scheduling complexity of a base station and a network side may be reduced.

In another example, if both the first indication information and the second indication information indicate that the first terminal device does not need to detect the PO corresponding to the first PEI, the first terminal device does not detect the PO corresponding to the first PEI.

In still another example, if at least one of the first indication information and the second indication information indicates that the first terminal device does not need to detect the PO corresponding to the first PEI, the first terminal device does not detect the PO corresponding to the first PEI.

The methods embodiments of the present application are described in detail above with reference to FIG. 1 to FIG. 5. The apparatus embodiments of the present application are described in detail below with reference to FIG. 6 to FIG. 10. It should be understood that the description of the method embodiments corresponds to the description of the apparatus embodiments, and therefore, for parts that are not described in detail, reference may be made to the foregoing method embodiments.

Figure 6:
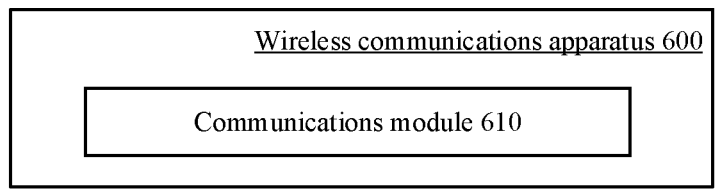
FIG. 6 is a schematic structural diagram of a wireless communications apparatus according to an embodiment of the present application.

FIG. 6 is a schematic structural diagram of a wireless communications apparatus according to an embodiment of the present application. An apparatus 600 in FIG. 6 is a first terminal device. The wireless communications apparatus 600 may include a communications module 610.

The communications module 610 may be configured to receive first PEI, where the first PEI corresponds to at least one PO, and the first PEI is associated with first information. The first information is used to indicate that a paging message in the at least one PO is a RAN-initiated paging message or a CN-initiated paging message.

In some embodiments, the first information is used to indicate a first information field and a second information field that are in the first PEI, the first information field is corresponding to the CN-initiated paging message, and the second information field is corresponding to the RAN-initiated paging message.

In some embodiments, the first information includes second information and/or third information, the second information indicates a quantity of subgroups in the first information field and/or a quantity of subgroups in the second information field, and the third information indicates a sequence of the first information field and the second information field in the first PEI.

In some embodiments, if the first terminal device is in an RRC inactive state, a subgroup sequence number of the first terminal device in the first PEI is as follows:

$$\text{floor}\left[\frac{UE_{ID}}{N*Ns}\right] \mod G_2 + G_1$$

where $UE_{ID}$ denotes an identity of the first terminal device, N denotes a quantity of paging frames in a paging cycle, Ns denotes a quantity of paging occasions in a paging frame, $G_1$ denotes a quantity of subgroups in the first information field, $G_2$ denotes a quantity of subgroups in the second information field, floor denotes a floor operation, and mod denotes a modulo operation.

In some embodiments, the second information is determined based on a SIB message or predefined by a protocol; and/or, the third information is determined based on a SIB message or predefined by a protocol.

In some embodiments, indication information for a subgroup to which a terminal device in an RRC inactive state belongs is located in the second information field.

In some embodiments, that indication information for a subgroup to which a terminal device in an RRC inactive state belongs is located in the second information field is predefined by a protocol.

In some embodiments, in subgroups indicated by the first PEI, a terminal device in an RRC idle state and a terminal device in an RRC inactive state belong to different subgroups.

In some embodiments, the first information is used to indicate that paging messages corresponding to the first PEI are all RAN-initiated paging messages; or the first information indicates that paging messages corresponding to the first PEI include a CN-initiated paging message.

In some embodiments, the first information is carried by at least one bit of the first PEI.

In some embodiments, if a value of the at least one bit is a first value, paging messages corresponding to the first PEI are all RAN-initiated paging messages; and/or, if a value of the at least one bit is a second value, paging messages corresponding to the first PEI comprise a CN-initiated paging message.

In some embodiments, the first information is an RNTI for scrambling the first PEI.

In some embodiments, if the first PEI is scrambled by using a first RNTI, paging messages corresponding to the first PEI are all RAN-initiated paging messages; and/or, if the first PEI is scrambled by using a second RNTI, paging messages corresponding to the first PEI include a CN-initiated paging message.

In some embodiments, the first information is DCI carrying the first PEI.

In some embodiments, if the DCI carrying the first PEI is first DCI, paging messages corresponding to the first PEI are all RAN-initiated paging messages; and/or, if the DCI carrying the first PEI is second DCI, paging messages corresponding to the first PEI include a CN-initiated paging message.

In some embodiments, if the first terminal device is in an RRC inactive state, the first terminal device reads the first DCI; and/or, if the first terminal device is in an RRC idle state, the first terminal device reads the second DCI.

Figure 7:
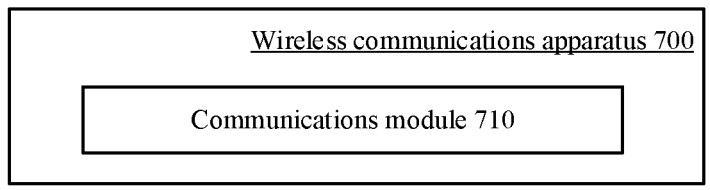
FIG. 7 is a schematic structural diagram of a wireless communications apparatus according to another embodiment of the present application.

FIG. 7 is a schematic structural diagram of a wireless communications apparatus according to another embodiment of the present application. A wireless communications apparatus 700 in FIG. 7 may be a base station. The wireless communications apparatus 700 includes a communications module 710. The communications module 710 may be configured to send first PEI, where the first PEI corresponds to at least one PO, and the first PEI is associated with first information. The first information is used to indicate that a paging message in the at least one PO is a RAN-initiated paging message or a CN-initiated paging message.

In some embodiments, the first information is used to indicate a first information field and a second information field that are in the first PEI, the first information field is corresponding to the CN-initiated paging message, and the second information field is corresponding to the RAN-initiated paging message.

In some embodiments, the first information includes second information and/or third information, the second information indicates a quantity of subgroups in the first information field and/or a quantity of subgroups in the second information field, and the third information indicates a sequence of the first information field and the second information field in the first PEI.

In some embodiments, if a first terminal device is in an RRC inactive state, a subgroup sequence number of the first terminal device in the first PEI is as follows:

$$\text{floor}\left[\frac{UE_{ID}}{N*Ns}\right] \bmod G_2 + G_1$$

where $UE_{ID}$ denotes an identity of the first terminal device, N denotes a quantity of paging frames in a paging cycle, Ns denotes a quantity of paging occasions in a paging frame, $G_1$ denotes a quantity of subgroups in the first information field, $G_2$ denotes a quantity of subgroups in the second information field, floor denotes a floor operation, and mod denotes a modulo operation.

In some embodiments, the second information is determined based on a SIB message or predefined by a protocol; and/or, the third information is determined based on a SIB message or predefined by a protocol.

In some embodiments, indication information for a subgroup to which a terminal device in an RRC inactive state belongs is located in the second information field.

In some embodiments, that indication information for a subgroup to which a terminal device in an RRC inactive state belongs is located in the second information field is predefined by a protocol.

In some embodiments, in subgroups indicated by the first PEI, a terminal device in an RRC idle state and a terminal device in an RRC inactive state belong to different subgroups.

In some embodiments, the first information is used to indicate that paging messages corresponding to the first PEI are all RAN-initiated paging messages; or the first information indicates that paging messages corresponding to the first PEI include a CN-initiated paging message.

In some embodiments, the first information is carried by at least one bit of the first PEI.

In some embodiments, if a value of the at least one bit is a first value, paging messages corresponding to the first PEI are all RAN-initiated paging messages; and/or, if a value of the at least one bit is a second value, paging messages corresponding to the first PEI include a CN-initiated paging message.

In some embodiments, the first information is an RNTI for scrambling the first PEI.

In some embodiments, if the first PEI is scrambled by using a first RNTI, paging messages corresponding to the first PEI are all RAN-initiated paging messages; and/or, if the first PEI is scrambled by using a second RNTI, paging messages corresponding to the first PEI include a CN-initiated paging message.

In some embodiments, the first information is DCI carrying the first PEI.

In some embodiments, if the DCI carrying the first PEI is first DCI, paging messages corresponding to the first PEI are all RAN-initiated paging messages; and/or, if the DCI carrying the first PEI is second DCI, paging messages corresponding to the first PEI include a CN-initiated paging message.

In some embodiments, if a first terminal device is in an RRC inactive state, the first terminal device reads the first DCI; and/or if a first terminal device is in an RRC idle state, the first terminal device reads the second DCI.

Figure 8:
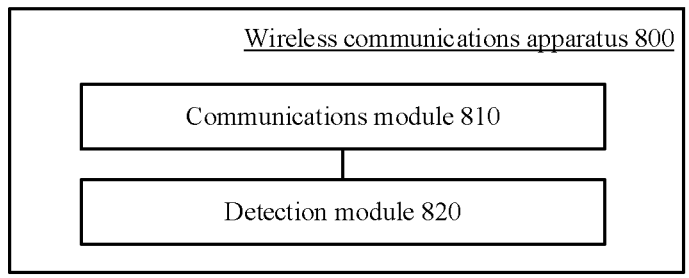
FIG. 8 is a schematic structural diagram of a wireless communications apparatus according to another embodiment of the present application.

FIG. 8 is a schematic structural diagram of a wireless communications apparatus according to another embodiment of the present application. A wireless communications apparatus 800 in FIG. 8 may be a first terminal device. The wireless communications apparatus 800 includes a communications module 810 and a detection module 820.

The communications module 810 may be configured to receive first PEI, where the first terminal device belongs to a first subgroup and a second subgroup, the first subgroup is configured to receive a CN-initiated paging message, and the second subgroup is configured to receive a RAN-initiated paging message. The first PEI includes first indication information and second indication information, the first indication information is indication information corresponding to the first subgroup, and the second indication information is indication information corresponding to the second subgroup.

The detection module 820 may be configured to detect the first indication information and/or the second indication information.

In some embodiments, detecting, by the first terminal device, the first indication information and/or the second indication information includes: detecting, by the first terminal device, the first indication information, and not detecting the second indication information; or detecting, by the first terminal device, the second indication information, and not detecting the first indication information.

In some embodiments, that the detecting, by the first terminal device, the first indication information, and not detecting the second indication information is predefined by a protocol or indicated by higher layer signaling; and/or, that the detecting, by the first terminal device, the second indication information, and not detecting the first indication information is predefined by a protocol or indicated by higher layer signaling.

In some embodiments, detecting, by the first terminal device, the first indication information and/or the second indication information includes: if at least one of the first indication information and the second indication information indicates that the first terminal device needs to detect a PO corresponding to the first PEI, detecting, by the first terminal device, the PO corresponding to the first PEI; or if both the first indication information and the second indication information indicate that the first terminal device does not need to detect a PO corresponding to the first PEI, not detecting, by the first terminal device, the PO corresponding to the first PEI; or if at least one of the first indication information and the second indication information indicates that the first terminal device does not need to detect a PO corresponding to the first PEI, not detecting, by the first terminal device, the PO corresponding to the first PEI.

Figure 9:
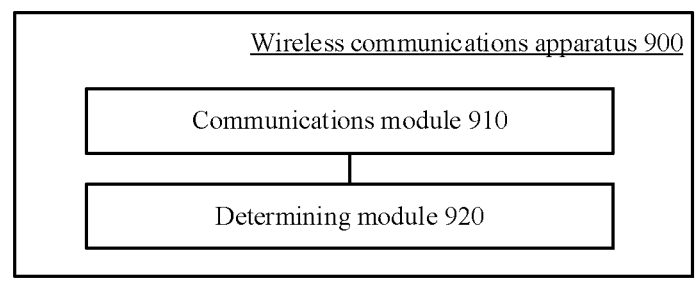
FIG. 9 is a schematic structural diagram of a wireless communications apparatus according to another embodiment of the present application.

FIG. 9 is a schematic structural diagram of a wireless communications apparatus according to another embodiment of the present application. A communications apparatus 900 in FIG. 9 may be a base station. The communications apparatus 900 may include a communications module 910 and a determining module 920.

The communications module 910 is configured to send first PEI, where a first terminal device belongs to a first subgroup and a second subgroup, the first subgroup is configured to receive a CN-initiated paging message, and the second subgroup is configured to receive a RAN-initiated paging message. The first PEI includes first indication information and second indication information, the first indication information is indication information corresponding to the first subgroup, and the second indication information is indication information corresponding to the second subgroup.

The determining module 920 is configured to determine that the first terminal device detects the first indication information and/or the second indication information.

In some embodiments, detecting, by the first terminal device, the first indication information and/or the second indication information includes: detecting, by the first terminal device, the first indication information, and not detecting the second indication information; or detecting, by the first terminal device, the second indication information, and not detecting the first indication information.

In some embodiments, that the detecting, by the first terminal device, the first indication information, and not detecting the second indication information is predefined by a protocol or indicated by higher layer signaling; and/or, that the detecting, by the first terminal device, the second indication information, and not detecting the first indication information is predefined by a protocol or indicated by higher layer signaling.

In some embodiments, detecting, by the first terminal device, the first indication information and/or the second indication information includes: if at least one of the first indication information and the second indication information indicates that the first terminal device needs to detect a PO corresponding to the first PEI, detecting, by the first terminal device, the PO corresponding to the first PEI; or if both the first indication information and the second indication information indicate that the first terminal device does not need to detect a PO corresponding to the first PEI, not detecting, by the first terminal device, the PO corresponding to the first PEI; or if at least one of the first indication information and the second indication information indicates that the first terminal device does not need to detect a PO corresponding to the first PEI, not detecting, by the first terminal device, the PO corresponding to the first PEI.

Figure 10:
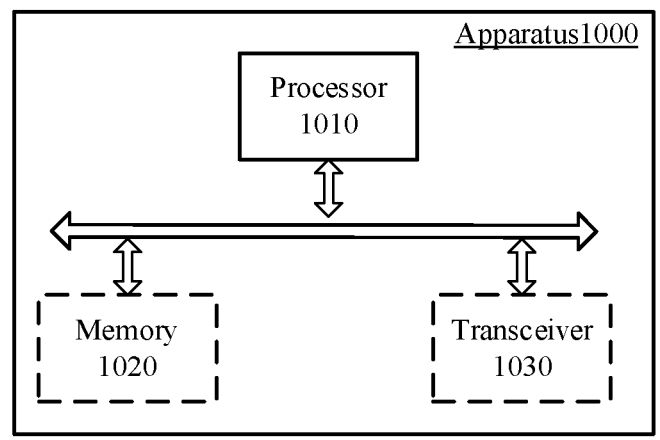
FIG. 10 is a schematic structural diagram of an apparatus according to an embodiment of the present application.

FIG. 10 is a schematic structural diagram of an apparatus according to an embodiment of the present application. The dashed lines in FIG. 10 indicate that the unit or module is optional. The apparatus 1000 may be configured to implement the methods described in the foregoing method embodiments. The apparatus 1000 may be a chip, a terminal device, or a network device.

The apparatus 1000 may include one or more processors 1010. The processor 1010 may allow the apparatus 1000 to implement the methods described in the foregoing method embodiments. The processor 1010 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like.

The apparatus 1000 may further include one or more memories 1020. The memory 1020 stores a program that may be executed by the processor 1010 to cause the processor 1010 to perform the methods described in the foregoing method embodiments. The memory 1020 may be independent of the processor 1010 or may be integrated into the processor 1010.

The apparatus 1000 may further include a transceiver 1030. The processor 1010 may communicate with another device or chip through the transceiver 1030. For example, the processor 1010 may send and receive data to and from another device or chip through the transceiver 1030.

An embodiment of the present application further provides a computer-readable storage medium for storing a program. The computer-readable storage medium may be applied to the wireless communications apparatus provided in the embodiments of the present application, and the program causes a computer to perform the methods to be performed by the terminal device or the base station in various embodiments of the present application.

An embodiment of the present application further provides a computer program product. The computer program product includes a program. The computer program product may be applied to the terminal device or the network device provided in the embodiments of the present application, and the program causes a computer to perform the methods to be performed by the terminal device or the base station in various embodiments of the present application.

An embodiment of the present application further provides a computer program. The computer program may be applied to the terminal device or the network device provided in the embodiments of the present application, and the computer program causes a computer to perform the methods to be performed by the terminal device or the base station in various embodiments of the present application.

It should be understood that, in the embodiments of the present application, "B that is corresponding to A" means that B is associated with A, and B may be determined based on A. However, it should also be understood that, determining B based on A does not mean determining B based only on A, but instead B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

It should be understood that, in the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:
receiving first paging early indication (PEI) by a first terminal device, wherein the first terminal device belongs to a first subgroup with a first subgroup ID and a second subgroup with a second subgroup ID, the first subgroup is associated with a core network (CN)-initiated paging message, the second subgroup is associated with a radio access network (RAN)-initiated paging message, the first PEI comprises at least one of first indication information or second indication information, the first indication information is indication information corresponding to the first subgroup, and the second indication information is indication information corresponding to the second subgroup; and
when both the first indication information and the second indication information indicate that the first terminal device does not need to detect a PO corresponding to the first PEI, refraining from detecting, by the first terminal device, the PO corresponding to the first PEI.

2. The method according to claim 1, further comprising:
using, by the first terminal device, at least one of the first subgroup ID or the second subgroup ID, wherein whether to use the first subgroup ID associated with the CN-initiated paging message or to use the second subgroup ID associated with the RAN-initiated paging message is determined according to a protocol specification.

3. The method according to claim 2, wherein using, by the first terminal device, at least one of the first subgroup ID or the second subgroup ID comprises:
when the first indication information is available to the first terminal device, using, by the first terminal device, the first subgroup ID; or
when the first subgroup ID is not available to the first terminal device, using, by the first terminal device, the second subgroup ID.

4. The method according to claim 1, further comprising:
when at least one of the first indication information or the second indication information indicates that the first terminal device needs to detect a paging occasion (PO) corresponding to the first PEI, detecting, by the first terminal device, the PO corresponding to the first PEI.

5. A first terminal device, comprising:
at least one processor;
one or more non-transitory computer-readable storage media coupled to the at least one processor and storing programming instructions for execution by the at least one processor, wherein the programming instructions, when executed, cause the first terminal device to perform operations comprising:
receiving first paging early indication (PEI) by the first terminal device, wherein the first terminal device belongs to a first subgroup with a first subgroup ID and a second subgroup with a second subgroup ID, the first subgroup is associated with a core network (CN)-initiated paging message, the second subgroup is associated with a radio access network (RAN)-initiated paging message, the first PEI comprises at least one of first indication information or second indication information, the first indication information is indication information corresponding to the first subgroup, and the second indication information is indication information corresponding to the second subgroup; and
when both the first indication information and the second indication information indicate that the first terminal device does not need to detect a PO corresponding to the first PEI, refraining from detecting, by the first terminal device, the PO corresponding to the first PEI.

6. The first terminal device according to claim 5, the operations further comprise:
using, by the first terminal device, at least one of the first subgroup ID or the second subgroup ID, wherein whether to use the first subgroup ID associated with the CN-initiated paging message or to use the second subgroup ID associated with the RAN-initiated paging message is determined according to a protocol specification.

7. The first terminal device according to claim 6, wherein using, by the first terminal device, at least one of the first subgroup ID or the second subgroup ID comprises
when the first indication information is available to the first terminal device, using, by the first terminal device, the first subgroup ID; or
when the first subgroup ID is not available to the first terminal device, using, by the first terminal device, the second subgroup ID.

8. The first terminal device according to claim 5, the operations further comprising:

when at least one of the first indication information or the second indication information indicates that the first terminal device needs to detect a paging occasion (PO) corresponding to the first PEI, detecting, by the first terminal device, the PO corresponding to the first PEI.

9. One or more non-transitory computer-readable media storing computer instructions, that when executed by one or more processors, cause a computing device to perform operations comprising:
receiving first paging early indication (PEI) by a first terminal device, wherein the first terminal device belongs to a first subgroup with a first subgroup ID and a second subgroup with a second subgroup ID, the first subgroup is associated with a core network (CN)-initiated paging message, the second subgroup is associated with a radio access network (RAN)-initiated paging message, the first PEI comprises at least one of first indication information or second indication information, the first indication information is indication information corresponding to the first subgroup, and the second indication information is indication information corresponding to the second subgroup; and
when both the first indication information and the second indication information indicate that the first terminal device does not need to detect a PO corresponding to the first PEI, refraining from detecting, by the first terminal device, the PO corresponding to the first PEI.

10. The one or more non-transitory computer-readable media according to claim 9, the operations further comprise:
using, by the first terminal device, at least one of the first subgroup ID or the second subgroup ID, wherein whether to use the first subgroup ID associated with the CN-initiated paging message or to use the second subgroup ID associated with the RAN-initiated paging message is determined according to a protocol specification.

11. The one or more non-transitory computer-readable media according to claim 10, wherein using, by the first terminal device, at least one of the first subgroup ID or the second subgroup ID comprises
when the first indication information is available to the first terminal device, using, by the first terminal device, the first subgroup ID; or
when the first subgroup ID is not available to the first terminal device, using, by the first terminal device, the second subgroup ID.

12. The one or more non-transitory computer-readable media according to claim 9, the operations further comprising:
when at least one of the first indication information or the second indication information indicates that the first terminal device needs to detect a paging occasion (PO) corresponding to the first PEI, detecting, by the first terminal device, the PO corresponding to the first PEI.

* * * * *